(12) United States Patent
Huang et al.

(10) Patent No.: US 10,880,751 B2
(45) Date of Patent: Dec. 29, 2020

(54) RESOURCE ALLOCATION METHOD, COMPUTER PROGRAM PRODUCT AND COMMUNICATION DEVICE

(71) Applicant: CLOUDMINDS (BEIJING) TECHNOLOGIES CO., LTD., Beijing (CN)

(72) Inventors: William Xiao-qing Huang, New York City, NY (US); Haitao Jiang, Beijing (CN); Zhenkai Wang, Beijing (CN)

(73) Assignee: CLOUDMINDS (BEIJING) TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 16/400,505

(22) Filed: May 1, 2019

(65) Prior Publication Data
US 2019/0261189 A1 Aug. 22, 2019

Related U.S. Application Data

(63) Continuation of application No. PCT/CN2016/104194, filed on Nov. 1, 2016.

(51) Int. Cl.
| | | |
|---|---|---|
| *H04W 16/14* | (2009.01) | |
| *H04W 72/10* | (2009.01) | |
| *H04W 84/04* | (2009.01) | |

(52) U.S. Cl.
CPC ........... *H04W 16/14* (2013.01); *H04W 72/10* (2013.01); *H04W 84/042* (2013.01)

(58) Field of Classification Search
CPC ....................................................... H04L 12/28
(Continued)

(56) References Cited

U.S. PATENT DOCUMENTS

| | | | |
|---|---|---|---|
| 2006/0056375 A1* | 3/2006 | Koyama | H04B 1/7172 370/342 |
| 2014/0126501 A1 | 5/2014 | Pan | |

(Continued)

FOREIGN PATENT DOCUMENTS

| | | |
|---|---|---|
| CN | 102149099 A | 8/2011 |
| CN | 103248466 A | 8/2013 |

(Continued)

OTHER PUBLICATIONS

Translation of CN 102149099, Telecom SCI & Technology Inst., Aug. 10, 2011, 16 pages.*

(Continued)

*Primary Examiner* — Dang T Ton (57) ABSTRACT

A resource allocation method, a computer program product and a communication device are disclosed. The method includes: determining, based on a configuration parameter of a first sub-frame, whether preferential transmission of the first sub-frame needs to be ensured, wherein the first sub-frame refers to a sub-frame in a first wireless communication system; defining a transmission direction of a second sub-frame which exerts cross-interference to the first sub-frame to be the same as that of the first sub-frame if preferential transmission of the first sub-frame needs to be ensured, wherein the second sub-frame refers to a sub-frame in a second wireless communication system; and defining OFDM symbols in the first sub-frame which exert cross-interference to the second sub-frame to be transmission prohibited if preferential transmission of the first sub-frame does not need to be ensured.

16 Claims, 7 Drawing Sheets

(58) Field of Classification Search
USPC .......................................................... 370/400
See application file for complete search history.

(56) References Cited

U.S. PATENT DOCUMENTS

2015/0009917 A1* 1/2015 Cho .................. H04W 74/0875
370/329
2016/0095074 A1* 3/2016 Park ...................... H04W 8/005
370/350

FOREIGN PATENT DOCUMENTS

| CN | 103391152 A | 11/2013 |
|---|---|---|
| CN | 103687014 A | 3/2014 |
| EP | 2696645 A1 | 2/2014 |
| WO | 2009083927 A1 | 7/2009 |
| WO | 2012044019 A2 | 4/2012 |
| WO | 2016048067 A2 | 3/2016 |

OTHER PUBLICATIONS

International Search Report dated Jun. 29, 2017; PCT/CN2016/104194.

Extended European Search Report and European search opinion dated Jul. 16, 2020; EP 16920821.2.

\* cited by examiner

RESOURCE ALLOCATION METHOD, COMPUTER PROGRAM PRODUCT AND COMMUNICATION DEVICE

CROSS-REFERENCE TO RELATED APPLICATIONS

This application is a continuation of International Application No. PCT/CN2016/104194, with an international filing date of Nov. 1, 2016, the entire contents of which are incorporated herein by reference.

TECHNICAL FIELD

The present application relates to the technical field of wireless communications, and in particular, relates to a resource application method, a computer program product and a communication device.

BACKGROUND

3GPP is now concentrating on evolution of 4G (TD-LTE) and 5G new air interface standardization. Shortening delays is a very important optimization objective, especially for TDD. Shortening sub-frame lengths is the simplest way to achieve this objective. For example, in a conventional TD-LTE system, sub-frames have a length of 1 ms, and in a future TD-LTE-Pro or 5G system, sub-frames have a length which may be even shorter, for example, 0.5 ms, 0.1 ms, 1/14 ms, 1/16 ms or the like.

The future 5G or TD-LTE-Pro system may be deployed on a new frequency band, or may be upgraded on the existing frequency band of the TD-LTE. As such, it is likely that the TD-LTE systems and the TD-LTE-Pro or 5G system having shorter sub-frames from the same carrier or different carriers are coexistent in a frequency-adjacency fashion on the same frequency band.

Figure 2:
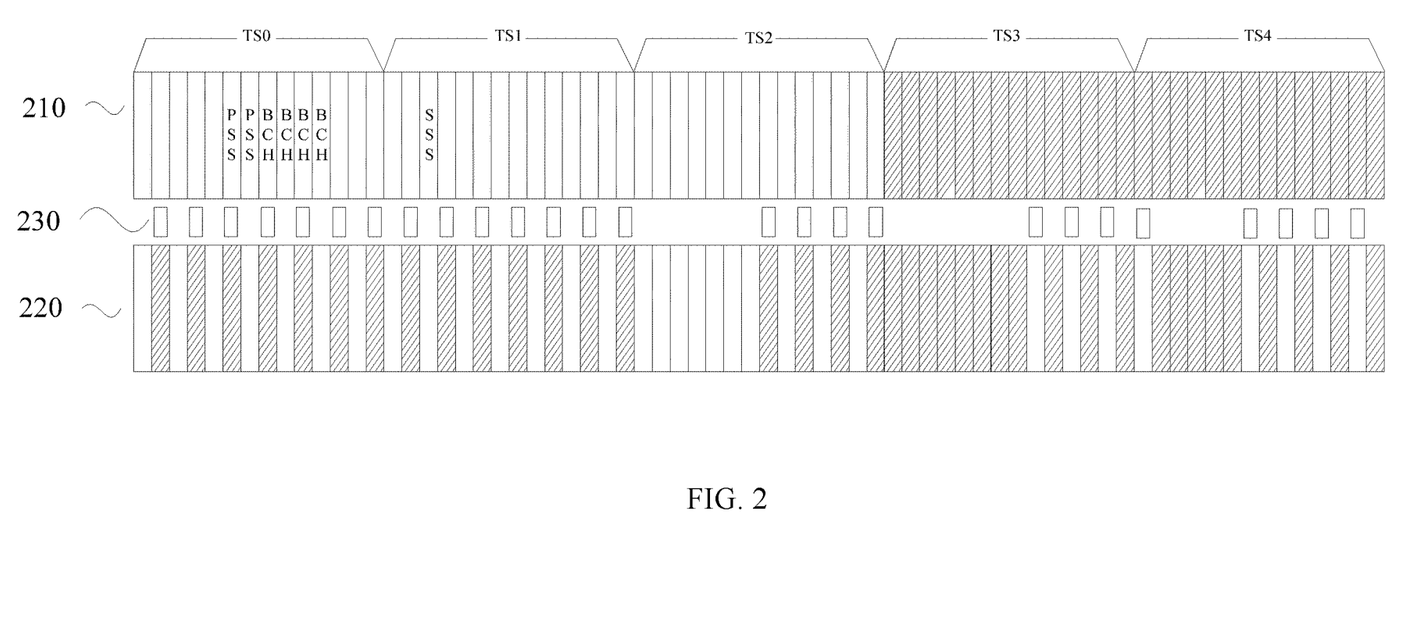
FIG. 2 is a schematic diagram of frame structures of sub-frames in first and second wireless communication systems according to an embodiment of the present application.

The inventors of the present application have identified during practice of the present application that in such a scenario, since the sub-frames have different lengths, cross timeslot interference (interference between base stations in the TE-LTE system and base stations of the TE-LTE-Pro/5G system) between the TD-LTE system and the TD-LTE-Pro/5G system or interference between terminals in these systems may be caused at some positions (for example, an interference position 230 as illustrated in FIG. 2). As such, working performance of the system and user experience may be severely degraded.

SUMMARY

An embodiment of the present disclosure provides a resource allocation method. The method includes: determining, based on a configuration parameter of a first sub-frame, whether preferential transmission of the first sub-frame needs to be ensured, wherein the first sub-frame refers to a sub-frame in a first wireless communication system; defining a transmission direction of a second sub-frame which exerts cross-interference to the first sub-frame to be the same as that of the first sub-frame if preferential transmission of the first sub-frame needs to be ensured, wherein the second sub-frame refers to a sub-frame in a second wireless communication system; and defining OFDM symbols in the first sub-frame which exert cross-interference to the second sub-frame to be transmission prohibited if preferential transmission of the first sub-frame does not need to be ensured.

Another embodiment of the present disclosure provides a computer program product for use in a resource allocation system. The computer program product includes: a non-volatile computer-readable storage medium, wherein the non-volatile computer-readable storage medium includes: a code configured to determine, based on a configuration parameter of a first sub-frame, whether preferential transmission of the first sub-frame needs to be ensured, wherein the first sub-frame refers to a sub-frame in a first wireless communication system; a code configured to: define a transmission direction of a second sub-frame which exerts cross-interference to the first sub-frame to be the same as that of the first sub-frame if preferential transmission of the first sub-frame needs to be ensured, wherein the second sub-frame refers to a sub-frame in a second wireless communication system; and a code configured to define OFDM symbols in the first sub-frame which exert cross-interference to the second sub-frame to be transmission prohibited if preferential transmission of the first sub-frame does not need to be ensured.

Still another embodiment of the present disclosure provides a communication device. The communication device includes at least one processor and a memory communicably connected to the at least one processor; wherein the memory stores instructions executable by the at least one processor, wherein, the instructions, when being executed by the at least one processor, cause the at least one processor to perform the steps of: determining, based on a configuration parameter of a first sub-frame, whether preferential transmission of the first sub-frame needs to be ensured, wherein the first sub-frame refers to a sub-frame in a first wireless communication system; defining a transmission direction of a second sub-frame which exerts cross-interference to the first sub-frame to be the same as that of the first sub-frame if preferential transmission of the first sub-frame needs to be ensured, wherein the second sub-frame refers to a sub-frame in a second wireless communication system; and define OFDM symbols in the first sub-frame which exert cross-interference to the second sub-frame to be transmission prohibited if preferential transmission of the first sub-frame does not need to be ensured.

DETAILED DESCRIPTION

For clear description of objectives, technical solutions, and advantages of the present application, the present application is further described in detail below by reference to the embodiments and the accompanying drawings. It should be understood that the specific embodiments described herein are only intended to explain the present application instead of limiting the present application.

Cross timeslot interference is interference caused between base stations or between terminals due to asynchronization between communication frames. For example, in a TD-SCDMA system, time slots are dynamically allocated, and when inconsistency of uplink-downlink switching points occurs between adjacent cells or between frequencies of the same cell, or when frame signals between base stations are asynchronous, such interference may be caused. As such, working performance of the system and user experience may be severely degraded.

The communication system is constantly in a continuously evolving process, for example, the current 4G (TD-LTE) evolution technology and 5G new air interface technical standardization. In the evolution, different communication systems may use different sub-frame lengths, and different communication systems may be used in the same region or cell. With respect to a new communication system in the evolution, for example, a 5G or TD-LTE-Pro system, in one aspect, such system may be deployed on a new frequency band different from that of the original communication system to replace the original communication system. In another aspect, for smooth evolution from the original communication system to the new communication system, the new communication system may also be deployed on the frequency band of the original communication system as an upgrade of the original communication system.

Where two different communication systems co-exist in a frequency-adjacency fashion on the same frequency band, if the sub-frame lengths between the communication systems are different, for example, the TD-LTE system and the TD-LTE-Pro system having a shorter sub-frame length, cross timeslot interference may occur at a position (an interference position 230 as illustrated in FIG. 2) where the sub-frames between the two communication systems are asynchronous, which severely degrades working performance of the system and user experience.

Figure 1:
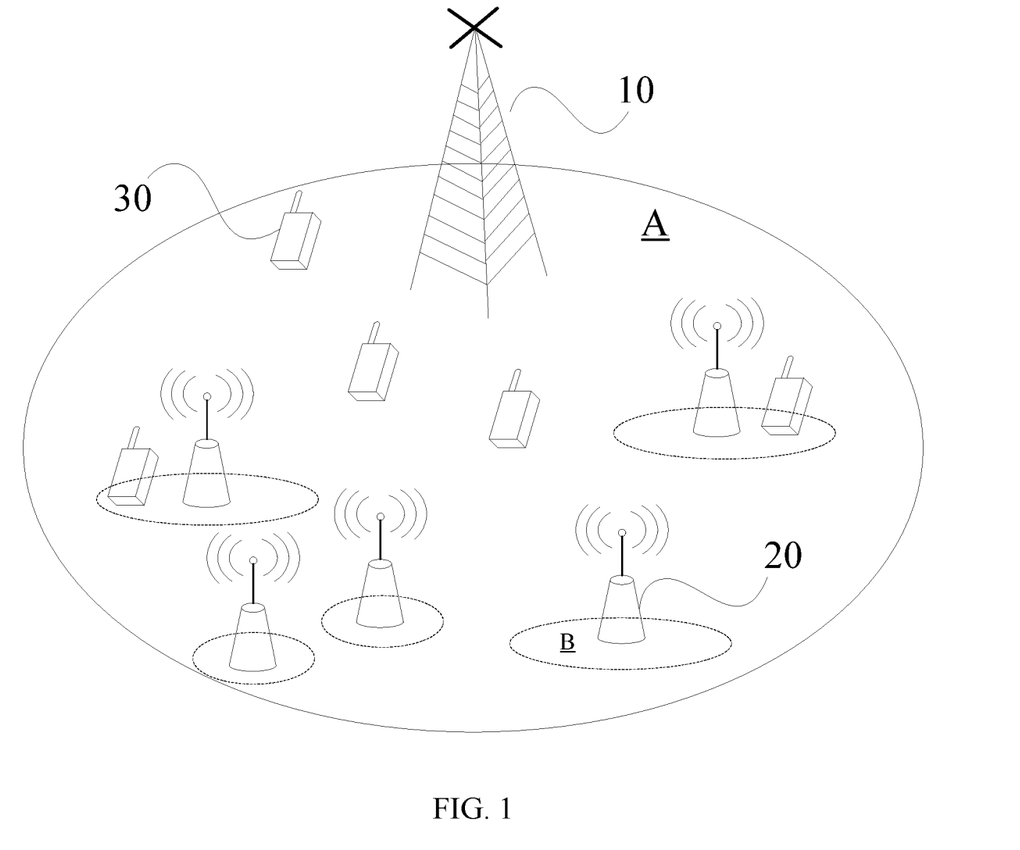
FIG. 1 is a schematic diagram of an application scenario according to an embodiment of the present application.

FIG. 1 is an application scenario of a resource allocation method and a system thereof according to an embodiment of the present application. As illustrated in FIG. 1, the application scenario involves: a first base station 10 pertaining to a first wireless communication system, a second base station 20 pertaining to a second wireless communication system, and a user terminal 30.

The first base station 10 provides wireless communication services based on the first wireless communication system for the user terminal 30, and the second base station 20 provides wireless communication services based on the second wireless communication system for the user terminal 30. The first base station 10 and the second base station 20 may communicate with each other directly via, for example, an X2 interface, or may communicate with each other indirectly via an additionally arranged functional unit, for example, an interoperable connection in a core network.

The user terminal 30 may select to use the first wireless communication network or the second wireless communication system specifically based on a hardware device condition, a network signal condition and the like external factors of the user terminal 30. The user terminal 30 may also be switched between the first wireless communication system and the second wireless communication system.

The user terminal 30 may be any suitable mobile communication device, for example, a smart phone, a tablet computer having a wireless communication module or other smart devices.

The first wireless communication network and the second wireless communication system may be specifically any type of communication system having different sub-frame lengths. For example, the first wireless communication system may be a TD-LTE system (a 4G system), and the second wireless communication system may be a future 5G system having a shorter sub-frame length.

In this application scenario, the first base station 10 provides a wide area coverage, and the first base station 10 may be a macro base station to ensure a communication coverage requirement in a macro cell A (that is, a region having a large area), for example, a communication requirement of user terminals which only support the TD-LTE system, or a mobility management requirement of user terminals which support the 4G/5G system.

In addition, a plurality of second base stations 20 are deployed to provide a communication coverage for a hotspot region B in the macro cell. The second base station 20 provides 5G system-based communication services to satisfy a high-capacity communication requirement of the user terminal 30 in a hotspot region.

Where hardware supports the user terminal 30, in the hotspot region B, the user terminal 30 may user wireless communication services provided by the 5G system, and may be handed over to the 4G system when entering a non-hotspot region A (a region that is out of the coverage of the second base station 20) in the macro cell.

FIG. 2 is a schematic diagram of a frame structure of a sub-frame according to an embodiment of the present application. The first wireless communication system and the second wireless communication system are deployed on the same frequency band. As illustrated in FIG. 2, since sub-frames have different lengths, transmission directions of sub-frames (hereinafter referred to as a first sub-frame 210 and a second sub-frame 220) of the first wireless communication system and the second wireless communication system at some positions may be inconsistent. That is, the first sub-frame is a downlink (or a control symbol) at this position, whereas the second sub-frame is an uplink at this position; or the first sub-frame is an uplink at this position, whereas the second sub-frame is a downlink at this position. Therefore, during running of the system, cross timeslot interference may occur at the above position. In FIG. 2, the interference position 230 (illustrated by a rectangular block in FIG. 2) represents the position where the cross timeslot interference is occurred.

Figure 3:
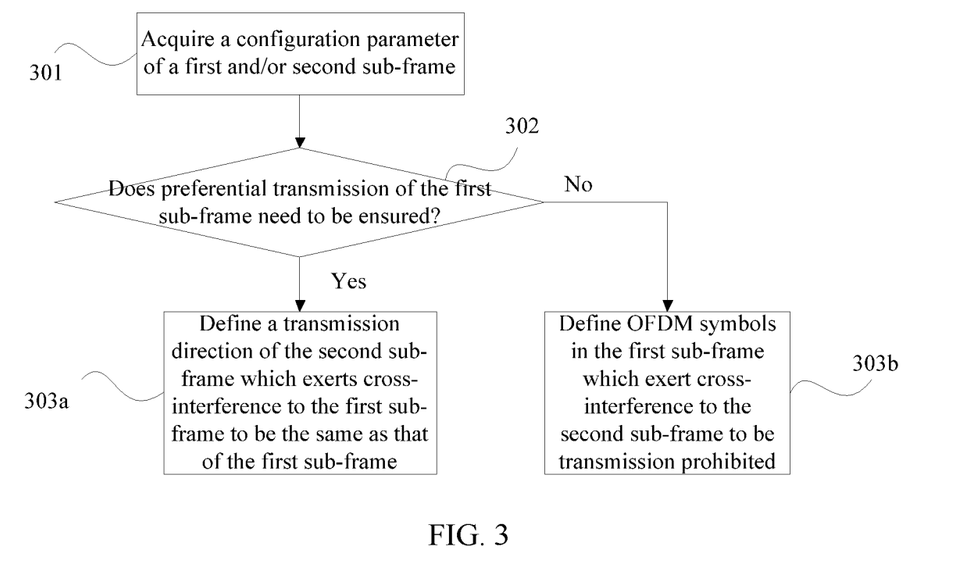
FIG. 3 is a flowchart of a resource allocation method according to an embodiment of the present application.

FIG. 3 is a flowchart of a resource allocation method according to an embodiment of the present application. The resource allocation method as illustrated in FIG. 3 may be applied to the application environment as illustrated in FIG. 1, to eliminate the cross timeslot interference at the interference position 230 in FIG. 2.

The resource allocation method according to the embodiment of the present application may be performed by any suitable electronic computing device or platform, for example, a functional entity or logic node or one or a plurality of first base stations/second base stations in a core network. For brevity of description, hereinafter the functional module, formed by software or hardware or a combination of software and hardware which is configured to perform the resource allocation method, is referred to as a multi-network resource manager.

As illustrated in FIG. 3, the multi-network resource manager may perform the following steps:

301: The multi-network resource manager acquires a configuration parameter of a first and/or second sub-frame. The configuration parameter may be a suitable type of parameter of the sub-frame which is used to define the sub-frame and measure an importance degree of the sub-frame, for example, an uplink-downlink sub-frame configuration parameter, and whether the sub-frame is a special sub-frame including a control signal, a service requirement of the sub-frame, a delay requirement of the sub-frame, or the like.

The multi-network resource manager may acquire the above configuration parameters in a plurality of suitable ways. For example, the first base station or the second base station reports the configuration parameter to the multi-network resource manager via a transmission interface, or the multi-network resource manager acquires the configuration parameter by monitoring broadcast information from the first base station or the second base station. In practical use, the configuration parameters to be acquired may be added or reduced according to the actual needs.

302: The multi-network resource manager determines, based on the configuration parameter of the first sub-frame, whether preferential transmission of the first sub-frame needs to be ensured. If preferential transmission of the first sub-frame needs to be ensured, step 303*a* is performed; and otherwise, step 303*b* is performed.

As described above, the cross timeslot interference is caused due to different transmission directions at some positions in the sub-frames in different communication systems. The different transmission directions may be caused due to different sub-frame lengths or other factors.

At such positions, the cross timeslot interference may be prevented by ensuring preferential transmission of the first sub-frame or the second sub-frame.

Based on the configuration parameter, the system measures an importance degree of the first sub-frame to determine whether to ensure preferential transmission of the first sub-frame. Scenarios where preferential transmission needs to be ensured include, but not limited to, occasions where the first sub-frame is a special sub-frame including a control signal and is a communication basis for the first wireless communication system or the first sub-frame imposes a higher requirement on delay, service traffic and the like at this time.

Whether preferential transmission of the first sub-frame needs to be ensured may also be a dynamic determination process. A result indicating whether the first sub-frame needs to be preferentially transmitted may be variable. That is, the multi-network resource manager may adjust a determination rule to measure the importance degree of the first sub-frame based on the variations in actual situation, for example, variations of the service requirement.

303*a*: The multi-network resource manager defines a transmission direction of the second sub-frame which exerts cross-interference to the first sub-frame to be the same as that of the first sub-frame.

If the first sub-frame has a higher importance degree, where preferential transmission of the first sub-frame is ensured, the transmission direction of the second sub-frame may be defined to be the same as that of the first sub-frame. In this way, the cross timeslot interference may be prevented from occurring at some positions (or time slots) in the first sub-frame in the uplink and downlink. For example, as illustrated in FIG. 2, the cross timeslot interference is prevented at the interference position 230 in a second first frame (TS1).

303*b*: The multi-network resource manager defines OFDM symbols in the first sub-frame which exert cross-interference to the second sub-frame to be transmission prohibited.

In some occasions, the second sub-frame is more important. Therefore, defining the OFDM symbols in the first sub-frame which exert cross-interference to the second sub-frame to be transmission prohibited (mute) may prevent cross timeslot interference from occurring at these positions. For example, as illustrated in FIG. 2, the cross timeslot interference is prevented at the interference position 230 in a four first frame (TS3).

In the embodiment, the multi-network resource manager proactively determines the importance degree of the first sub-frame based on the acquired configuration parameter, to determine whether preferential transmission of the first sub-frame needs to be ensured. Further, the cross timeslot interference at the interference positions is prevented by differentially processing the first sub-frames having different importance degrees. This resource allocation manner ensures stable running of the system and satisfies communication needs of users while preventing the cross timeslot interference.

Figure 4:
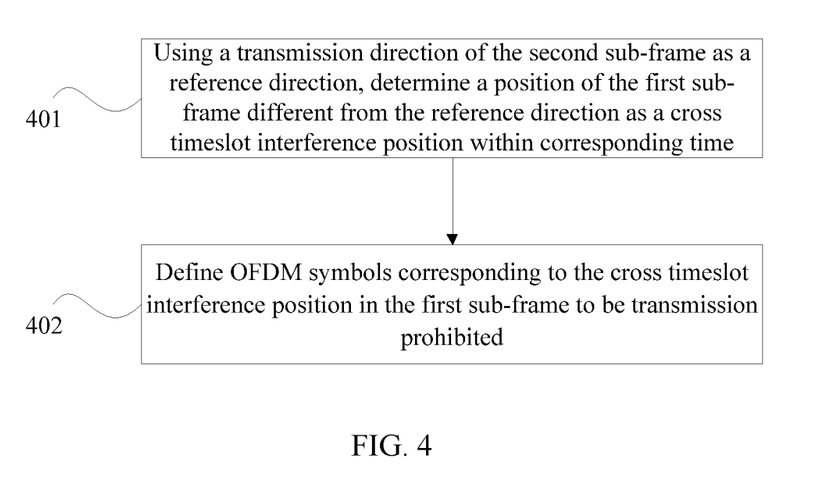
FIG. 4 is a flowchart of step 305b according to an embodiment of the present application.

In some embodiments, step 305*b* may be performed specifically in the fashion as illustrated in FIG. 4. As illustrated in FIG. 4, step 305*b* may include the following steps:

401: Using a transmission direction of the second sub-frame as a reference direction, a position of the first sub-frame different from the reference direction is determined as a cross timeslot interference position within corresponding time.

In the occasion of step 305*b*, the second sub-frame is more important relative to the first sub-frame, and preferential transmission of the second sub-frame should be ensured. Therefore, the transmission direction of the second sub-frame is used as a reference.

As described above, at corresponding time positions of the first sub-frame and the second sub-frame, if the transmission directions of the first sub-frame and the second sub-frame are different, interference may be caused. Therefore, based on this, a cross timeslot interference position between the first sub-frame and the second sub-frame may be determined.

402: OFDM symbols corresponding to the cross timeslot interference position in the first sub-frame are defined to be transmission prohibited.

The OFDM symbol is a composition unit in a frame structure. In different communication systems, the used frame structures are all composed of a fixed number of OFDM symbols. For example, in a TD-LTE system with normal cyclic prefixes (CP), each sub-frame has 14 OFDM symbols, and in a TD-LTE system with extended cyclic prefixes (CP, for eliminating interference between the symbols), each sub-frame has 12 OFDM symbols.

After the OFDM symbols at the cross timeslot interference position are defined to be transmission prohibited, the OFDM symbols at this position are not used to transmit uplink or downlink data. In this way, the problem that transmission directions at the same time position are different and interference is caused is addressed. Such configuration may ensure that the corresponding second sub-frame successfully carries out data communication and complete data transmission, such that interference is prevented.

In the embodiment of the present application, after step 305b is performed, a portion of the first sub-frames, for example, the OFDM symbols in the first sub-frame corresponding to TS3 in FIG. 2 may be defined to be transmission prohibited. Therefore, in normal application, the first sub-frame based on the first wireless communication system generally includes the first sub-frame where a portion of OFDM symbols are defined to be transmission prohibited.

When the terminal demodulates such first sub-frames where no all OFDM symbols bear data, normal demodulation of such first sub-frames (the first sub-frame after step 305b is performed) may be ensured in combination with additional auxiliary information. Specifically, the auxiliary information for assisting the terminal to demodulate the first sub-frame is provided in any suitable fashion.

Optionally, the auxiliary information is provided to the terminal in the following way:

transmitting symbol patterns of the OFDM symbols defined to be transmission prohibited in a common control region of the first sub-frame.

The symbol patterns may be positions of the OFDM symbols which are prohibited from transmission in one first sub-frame, or other information related to the positions of the OFDM symbols which are prohibited from transmission. When the terminal decodes the first sub-frame, the OFDM symbols which are prohibited from transmission may be removed based on the symbol patterns to ensure normal demodulation of the first sub-frame. Typically, a sub-frame may be partitioned into a control region and a data region. In a specific communication system, the control region may have a fixed number of symbols, and the common control region may the control region or a portion of the control region.

In the embodiment, in one aspect, the first wireless communication system ensures normal running of the second wireless communication system by prohibiting transmission of the OFDM symbols in the first sub-frame of the first wireless communication system, such that a sufficient service capacity or a service offload effect is achieved. Transmission prohibition of the OFDM symbols may as much as possible improve utilization rate of the time slots, and prevents the cross timeslot interference from occurring while preventing unnecessary transmission prohibition at other positions in the first sub-frame.

In another aspect, the way of sending the symbol patterns to the terminal in the common control region of the first sub-frame as the auxiliary information, it may be ensured that the scheduled terminal normally demodulates the data in the first wireless communication system.

In some other embodiments, the first sub-frame may be a control sub-frame including a control signal. The control signal may be control-specific data of some non-user data used by the first wireless communication system for receiving broadcast information, control information, synchronization signals or the like, for example, broadcast information, a secondary synchronization signal (SSS) or a primary synchronization signal (PSS).

Typically, such control signals are very important for the first wireless communication system, and thus secure and complete transmission of data over such control signals needs to be ensured. Otherwise, where such control-specific data is lost, even if user data is completely received, the user data may still not be correctly interpreted.

Accordingly, when the multi-network resource manager determines that the first sub-frame is a control sub-frame based on the configuration data, it may be determined that the first sub-frame is a first sub-frame which needs to be preferentially transmitted.

In a scenario where the first sub-frame is a control sub-frame bearing the broadcast information and the secondary synchronization signal, for example, the first sub-frame at the position corresponding to TS0 in FIG. 2, the multi-network resource manager may determine that the first sub-frame is the control sub-frame, and accordingly define the transmission direction of the second sub-frame to be the same as that of the first sub-frame to prevent occurrence of the cross timeslot interference.

In a scenario where the first sub-frame is a control sub-frame bearing the primary synchronization signal, for example, the first sub-frame at the position corresponding to TS1 in FIG. 2, after it is determined that preferential transmission of the first sub-frame needs to be ensured, the multi-network resource manager may define the transmission direction of the second sub-frame within corresponding time of first three OFDM symbols of the first sub-frame as downlink.

Such configuration may ensure that the first wireless communication system receives the primary synchronization signal, and ensure normal running of the system.

Figure 5:
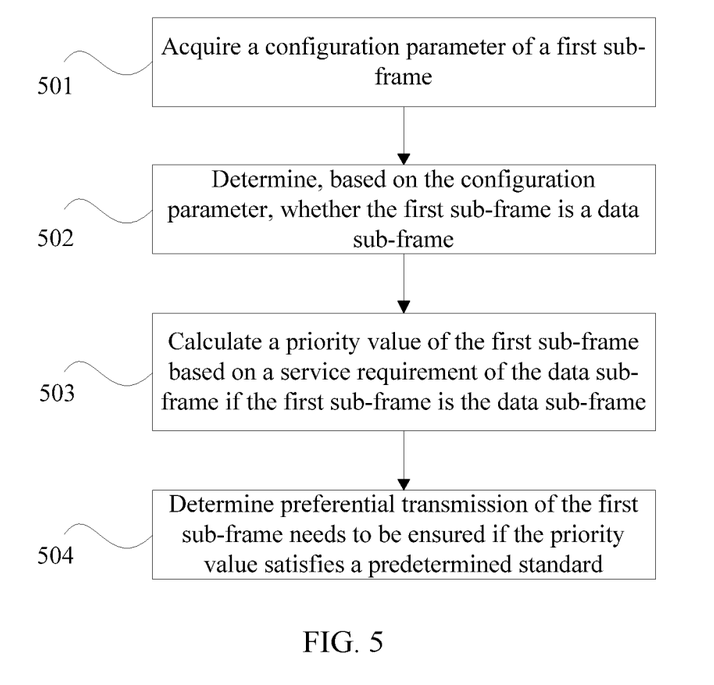
FIG. 5 is a flowchart of a resource allocation method when a first sub-frame is a data sub-frame according to an embodiment of the present application.

In some other embodiments, the first sub-frame may also a generic data sub-frame for bearing common transmission data. FIG. 5 is a flowchart of a resource allocation method in a scenario where the first sub-frame is a data sub-frame.

As illustrated in FIG. 5, the resource allocation method includes the following steps (For brevity of description, FIG. 5 only illustrates steps in the scenario where the first sub-frame is a data sub-frame. In some embodiments, the resource allocation method may also include the steps as illustrated in FIG. 4 and FIG. 5):

501: A configuration parameter of a first sub-frame is acquired.

502: Whether the first sub-frame is a data sub-frame is determined based on the configuration parameter.

As described above, in the embodiment, the scenario where the first sub-frame is a data sub-framer is described only. The first sub-frame may be other types of sub-frames, for example, the control sub-frame or other types of sub-frame as described in the above embodiments. The type of the sub-frame may be determined based on the communication system that is specifically used in the first wireless communication system. For example, a TDD frame may include two half-frames having a length of 5 ms, wherein each half-frame is composed of five sub-frames having a length of 1 ms. Each half-frame includes four common sub-frames and one special sub-frame. The common sub-frame (that is, the data sub-frame) is composed of two time slots having a length of 0.5 ms, whereas the special sub-frame (that is, the control sub-frame) is composed of three special time slots (DwPTS, GP and UpPTS).

503: A priority value of the first sub-frame is calculated based on a service requirement of the data sub-frame if the first sub-frame is the data sub-frame.

The service requirement refers to a standard that is related to the data sub-frame and needs to be satisfied by the data sub-frame, for example, a service delay requirement of the data sub-frame, uplink and downlink service traffic of the data sub-frame or the like. With respect to the data sub-frame, the service requirement thereof may reflect an importance degree of the data sub-frame. For example, where an uplink and downlink service traffic of the first sub-frame is great, it indicates that in this case, the first sub-frame has a higher importance degree and should be preferentially transmitted; or where a shorter service delay is required for the first sub-frame, it also indicates that the first sub-frame has a higher importance degree and should be preferentially transmitted.

Accordingly, the priority value of the first sub-frame may be calculated based on the specific service requirement. The priority value is a total value that is used to reflect various different types of requirements within the service requirement. That is, the priority value is defined by a numerical value instead of unit. The service requirement may include a plurality of different requirements. The different requirements are combined by using a predetermined calculation algorithm, for example, by assigning different weights and summing the assigned weights or any other suitable normalization function, and the service requirement combination is mapped to a discrete or contiguous value region as the priority value.

In other words, the priority value may be specifically any suitable data type, for example, a discrete value corresponding to the priority, for example, integers 1, 2 and 3 or a contiguous value range, i.e., 1 to 3 (which may be 2.5 or 2.8).

504: It is determined that preferential transmission of the first sub-frame needs to be ensured if the priority value satisfies a predetermined standard.

The predetermined standard may be specifically defined according to the actual scenario. At different times, different base stations or in different communication systems, a standard corresponding to the specific scenario may be employed. For completing the comparison between the priority value and the standard, the predetermined standard corresponds to the priority value in terms of data type.

Where the priority value satisfies the predetermined standard, it indicates that the first sub-frame has a higher importance degree in the current scenario. In such a scenario, preferential transmission of the first sub-frame needs to be ensured to satisfy the requirement of system running.

Optionally, in different scenarios, to accommodate variations of the scenarios, the predetermined standard needs to be adjusted. The adjustment may specifically include the following steps:

Firstly, the predetermined standard is adjusted based on service offload policies of the first wireless communication system and the second wireless communication system. The service offload policies refer to offloading affordable service traffic to the first or second wireless communication system based on the respective use requirements of the first and second wireless communication systems, for example, a scenario where the number of user terminals in the current hotspot region is great. That is, the predetermined standard is adjusted based on the service offload policy.

Then, the number of first sub-frames for which preferential transmission needs to be ensured is modified based on an adjusted predetermined standard. After the predetermined standard is adjusted, the priority value of the first sub-frame does not vary with the predetermined standard. Therefore, if the predetermined standard is up-shifted, the number of first sub-frames satisfying the predetermined standard is decreased. On the contrary, if the predetermined standard is down-shifted, the number of first sub-frames satisfying the predetermined standard may be increased.

As described in the above embodiment, the first sub-frames satisfying the predetermined standard are sub-frames that need to be preferentially transmitted. Where the number of first sub-frames that need to be preferentially transmitted is great, it indicates that the first wireless communication system is capable of bearing a greater service traffic, and correspondingly, the second wireless communication system is capable of bearing a smaller service traffic. In this way, resource allocation is practiced in a specific frequency band and a specific service offload policy is fulfilled.

For example, where the number of user terminals in the current hotspot region is great or the system is undergoing a peak time period (for example, 6 to 8 o'clock in the evening), it may be determined that the service offload policy is to enable the second wireless communication system (for example, the 5G system) to bear more services. In addition, based on the service offload policy, the predetermined standard is up-shifted, such that the second wireless communication system bears more services, thereby fulfilling the service offload policy of enabling the second wireless communication system to bear more services.

A specific fashion of adjusting the predetermined standard is determined according to the actual needs of the service offload policy. The predetermined standard may be adjusted in a fashion of being positively correlated to the service offload policy or linearly growing with the service offload policy.

Figure 6:
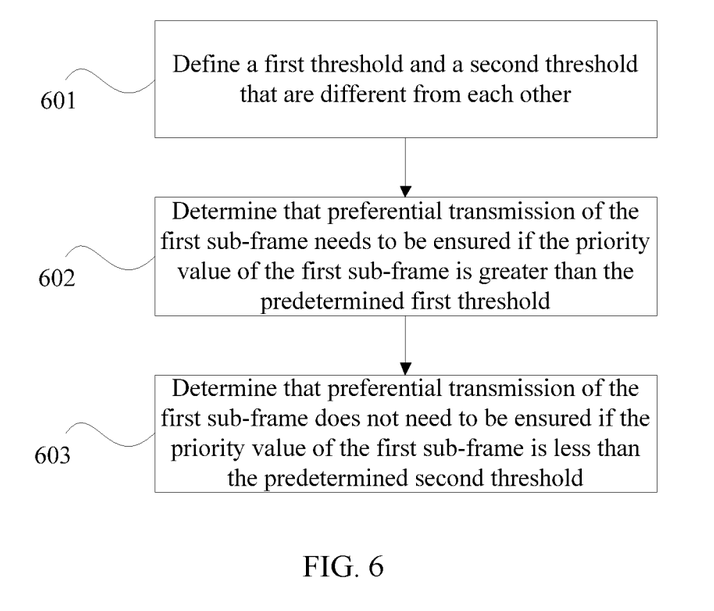
FIG. 6 is a flowchart of a method for judging whether a priority value satisfies a predetermined standard according to an embodiment of the present application.

FIG. 6 illustrates a method for determining whether the predetermined standard is satisfied according to the embodiment. As illustrated in FIG. 6, the method may specifically include the following steps:

601: A first threshold and a second threshold that are different from each other are defined. The first threshold and the second threshold may be predetermined thresholds, and are feasible standards in the predetermined standards in the above embodiments. In some embodiments, the threshold may be a predetermined function or mapping relationship. Using the function or mapping relationship, the corresponding thresholds are acquired by calculation based on an actual offload policy such that dynamic variations are achieved, and requirements of different offload policies are satisfied.

602: It is determined that preferential transmission of the first sub-frame needs to be ensured if the priority value of the first sub-frame is greater than the predetermined first threshold.

If the priority value is greater than the first threshold, it indicates that the predetermined standard is satisfied, and it may be considered that in such a scenario, the first sub-frame has a higher importance degree and preferential transmission of the first sub-frame needs to be ensured.

603: It is determined that preferential transmission of the first sub-frame does not need to be ensured if the priority value of the first sub-frame is less than the predetermined second threshold.

If the priority value is less than the second threshold, it indicates that the predetermined standard is not satisfied. That is, in such a scenario, the second wireless communication system needs to bear more services.

Optionally, since the first threshold and the second threshold that are different from each other are used, the adjustment of the predetermined standard may be separately adjusting one of the first threshold and the second threshold, for example, separately increasing the first threshold to decrease the number of first sub-frames satisfying the requirement, or applying different adjustment manners to the two thresholds. Such threshold defining fashion may provide a more flexible standard adjustment manner, and be adaptive to more detailed depicted service offload policy.

In the above embodiment, in one aspect, concepts are given to how to differentially process the first sub-frames based on the configuration parameter and the like information, and to adjust the transmission direction or transmission mode to prevent cross timeslot interference from occurring at the interference position.

In another aspect, a concept is given to how to allocate resources between the first wireless communication system and the second wireless communication system in such a fashion, to fulfill different service offload policies. When the resource allocation method according to the embodiment of the present application is performed in the application scenario as illustrated in FIG. 1, different base stations may have different service offload policies. Therefore, the resource allocation method may also configure different predetermined standards to satisfy such diversified requirements. In this way, the predetermined standard does not need to be configured in the whole network unifiedly, and more flexibility and higher efficiency are achieved.

Optionally, prior to the step (302) of determining whether preferential transmission of the first sub-frame needs to be ensured, an alignment operation may be performed between the first wireless communication system and the second wireless communication system to ensure that the two communication systems are aligned to each other in terms of communication frames (for example, wireless frames or super-frames), such that a time position where the first sub-frame and the second sub-frame are crossed is determined correctly (that is, the transmission direction of the first sub-frame is different from that of the second sub-frame).

The alignment operation may specifically include: acquiring a start position of the first sub-frame; and configuring a start position of the second sub-frame based on the start position of the first sub-frame to align the first sub-frame with the second sub-frame.

Figure 7:
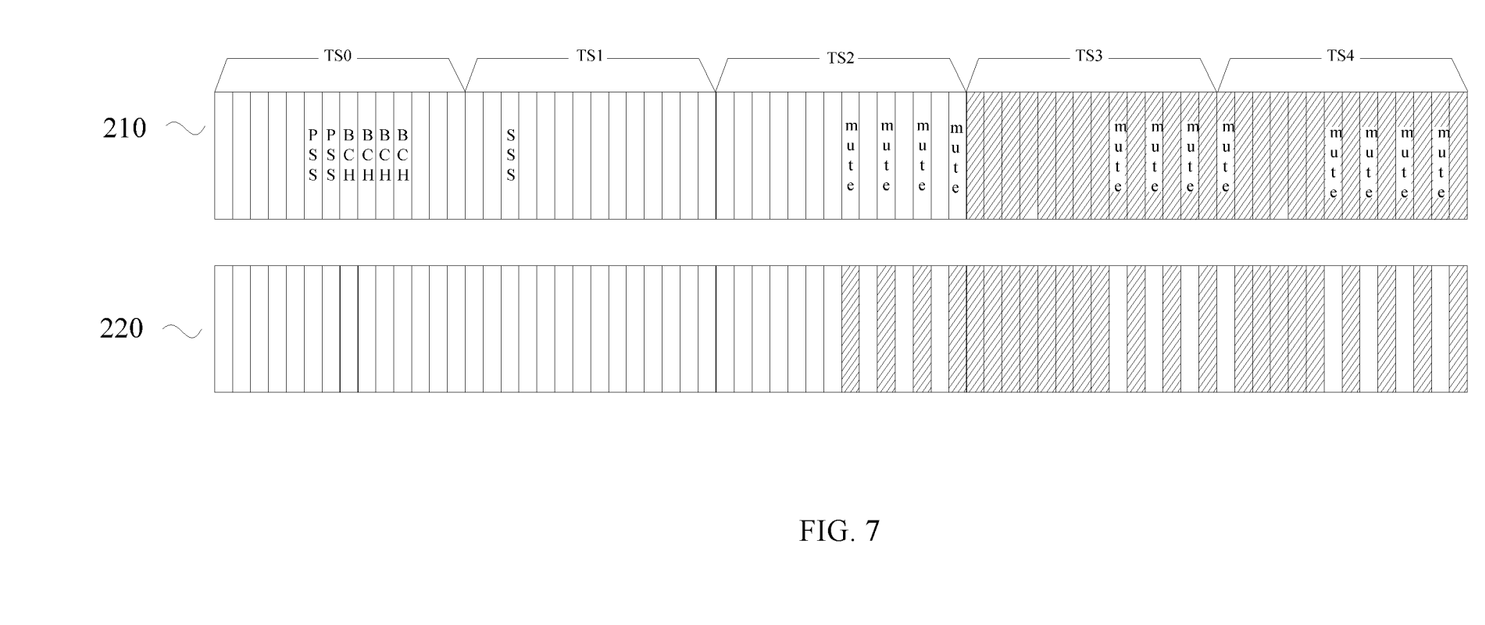
FIG. 7 is a schematic diagram of frame structures of sub-frames as illustrated in FIG. 2 after the resource allocation method according to the embodiment of the present application is performed.

FIG. 7 is a schematic diagram of frame structures of sub-frames as illustrated in FIG. 2 after the resource allocation method according to the embodiment of the present application is performed. As illustrated in FIG. 7, the first wireless communication system includes five first sub-frames 210 TS0-TS5, and the second wireless communication system also correspondingly includes second sub-frames 220 in alignment with the first sub-frames. In FIG. 7, a blank block indicates that the symbol is a downlink, a shadow block indicates that the symbol is an uplink, and the symbol bearing a control signal is represented by a corresponding identifier.

From the perspective of the first sub-frame, TS0, TS1 and TS3 are first sub-frames that need to be preferentially transmitted (wherein TS0 and TS1 are first sub-frames including a control signal, and TS3 is a data sub-frame), and TS2 and TS4 are first sub-frames that do not need to be preferentially transmitted. Therefore, with respect to TS0, TS1 and TS3, the transmission direction at the corresponding time of the aligned second sub-frame is changed to the transmission direction of the first sub-frame. With respect to TS2 and TS4, the symbols at the interference position need to be defined to be transmission prohibited (mute).

As illustrated in FIG. 7, after the multi-network resource manager carries out resource allocation (that is, determining whether preferential transmission of the first sub-frame needs to be ensured, and performing the corresponding method) for the TD-LTE and 5G system respectively, based on start positions and configuration parameters of the wireless frames or super-frames in the first wireless communication system (for example, TD-LTE) and the second wireless communication system (for example, 5G) in combination with different service offload policies, the cross timeslot interference occurred at the interference position 230 as illustrated in FIG. 2 may be prevented.

In this way, an optimal usage effect of the resources (for example, the first base station and the second base station) between two wireless communication systems on the same frequency band may be achieved. With respect to a carrier, upgrade and smooth transition from the first wireless communication system to the second wireless communication system may be practiced. Remaining users of the first wireless communication system (for example, TD-LTE) may also be provided with normal use and access, and the resource (for example, the second base station) in the second wireless communication network (5G) may be sufficiently utilized. For example, in a hotspot region in the system, more service traffic is borne, and user experience is thus improved.

Figure 8:
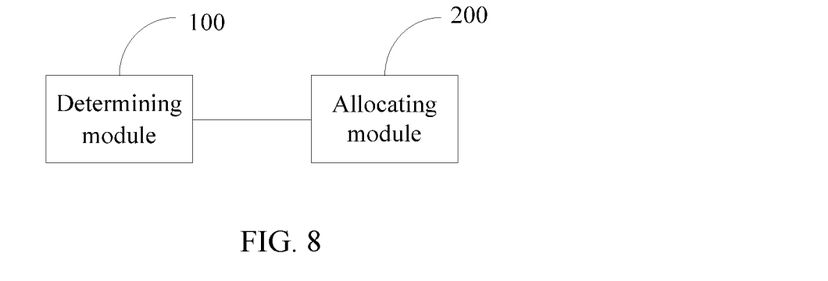
FIG. 8 is a functional block diagram of a resource allocation system according to an embodiment of the present application.

An embodiment of the present application further provides a resource allocation system. As illustrated in FIG. 8, the system includes: a determining module 100 and an allocating module 200.

The determining module 100 is configured go determine, based on a configuration parameter of a first sub-frame, whether preferential transmission of the first sub-frame needs to be ensured, wherein the first sub-frame refers to a sub-frame in a first wireless communication system. The allocating module 200 is configured to define a transmission direction of a second sub-frame which exerts cross-interference to the first sub-frame to be the same as that of the first sub-frame if preferential transmission of the first sub-frame needs to be ensured, wherein the second sub-frame refers to a sub-frame in a second wireless communication system; and define OFDM symbols in the first sub-frame which exert cross-interference to the second sub-frame to be transmission prohibited if preferential transmission of the first sub-frame does not need to be ensured.

Optionally, the determining module 100 is specifically configured to: determine, based on the configuration parameter, whether the first sub-frame is a control sub-frame; and determine that preferential transmission of the first sub-frame needs to be ensured if the first sub-frame is the control sub-frame.

Where the determining module 100 determines that the first sub-frame is a control sub-frame, if the first sub-frame is a control sub-frame bearing a primary synchronization signal, the allocating module 200 is further specifically configured to define the transmission direction of the second sub-frame within corresponding time of first three OFDM symbols of the first sub-frame as downlink.

Optionally, the determining module 100 is further specifically configured to: determine, based on the configuration parameter, whether the first sub-frame is a data sub-frame; calculate a priority value of the first sub-frame based on a service requirement of the data sub-frame if the first sub-frame is the data sub-frame; and determine that preferential transmission of the first sub-frame needs to be ensured if the priority value satisfies a predetermined standard.

Figure 9:
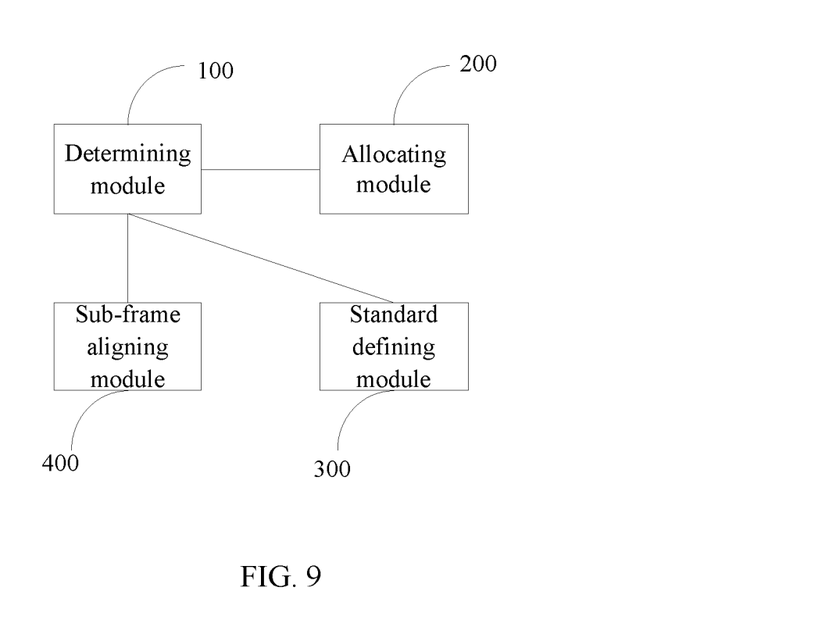
FIG. 9 is a functional block diagram of a resource allocation system according to another embodiment of the present application.

In some embodiments, as illustrated in FIG. 9, in addition to the modules 100 and 200 as illustrated in FIG. 8, the system may further include: a standard defining module 300, configured to adjust the predetermined standard based on different scenarios or actual needs, for example, service offload policies.

The standard defining module 300 is configured to: adjust the predetermined standard based on service offload policies of the first wireless communication system and the second wireless communication system; and modify, based on an adjusted predetermined standard, the number of first sub-frames for which preferential transmission need to be ensured.

In the embodiment, corresponding to the predetermined standards represented by the first threshold and the second threshold, the determining module 100 is specifically configured to:

determine that preferential transmission of the first sub-frame needs to be ensured if the priority value of the first sub-frame is greater than a predetermined first threshold; and determine that preferential transmission of the first sub-frame does not need to be ensured if the priority value of the first sub-frame is less than a predetermined second threshold, wherein the first threshold is different from the second threshold.

As described above, the first sub-frame and the second sub-frame generally have different sub-frame lengths. Therefore, prior to determining the interference position or performing the subsequent operations, the sub-frames may be firstly aligned such that the two wireless communication systems are aligned to each other in the aspect of wireless frames or super-frames. In the embodiment, as illustrated in FIG. 9, the system may further include a sub-frame aligning module 400. The sub-frame aligning module 400 is configured to acquire a start position of the first sub-frame, and configure a start position of the second sub-frame based on the start position of the first sub-frame to align the first sub-frame with the second sub-frame.

In some other embodiments, where preferential transmission of the first sub-frame does not need to be ensured, the allocating module 200 may be specifically configured to: using a transmission direction of the second sub-frame as a reference direction, determine a position of the first sub-frame different from the reference direction as a cross timeslot interference position within corresponding time; and define OFDM symbols corresponding to the cross timeslot interference position in the first sub-frame to be transmission prohibited.

By using the allocating module 200, a capacity and service traffic of the second wireless communication system may be ensured. After the allocating module 200 defines transmission prohibition, some auxiliary information related to the symbols that are prohibited from transmission may be provided to ensure normal demodulation of the first sub-frame.

Therefore, in some embodiments, the allocating module 200 may be further configured to transmit symbol patterns of the OFDM symbols defined to be transmission prohibited in a common control region of the first sub-frame. In this way, the auxiliary information is sent to a demodulating terminal.

In practical running of the resource allocation system according to the embodiment of the present application, firstly the sub-frame aligning module 400 may acquire the start position of the first sub-frame, and then configure the start position of the second sub-frame based on the start position of the first sub-frame to align the first sub-frame with the second sub-frame.

Upon completion of the alignment, the determining module 100 may determine, based on the configuration parameter of the first sub-frame, whether preferential transmission of the first sub-frame needs to be ensured. The determining module 100 may specifically make the determination based on whether a priority value satisfies a predetermined standard when the first sub-frame is a control sub-frame or the first sub-frame is a data sub-frame.

During the determination process, the standard defining module 300 may adjust the predetermined standard based on service offload policies of the first wireless communication system and the second wireless communication system; and modify, based on an adjusted predetermined standard, the number of first sub-frames for which preferential transmission need to be ensured.

Upon completion of the determination, the allocating module 200 defines a transmission direction of a second sub-frame which exerts cross-interference to the first sub-frame to be the same as that of the first sub-frame if preferential transmission of the first sub-frame needs to be ensured, wherein the second sub-frame refers to a sub-frame in a second wireless communication system; and defines OFDM symbols in the first sub-frame which exert cross-interference to the second sub-frame to be transmission prohibited if preferential transmission of the first sub-frame does not need to be ensured.

When the allocating module 200 defines the OFDM symbols to be transmission prohibited, the allocating module 200 may further transmit symbol patterns of the OFDM symbols that are defined to be transmission prohibited in a common control region of the first sub-frame to ensure normal demodulation of the first sub-frame.

It should be noted that since the resource allocation method and the resource allocation system are based on the same inventive concept, the corresponding content in the apparatus embodiments likewise applies to the method embodiments, and the corresponding content in the method embodiments likewise applies to the apparatus embodiments.

Figure 10:
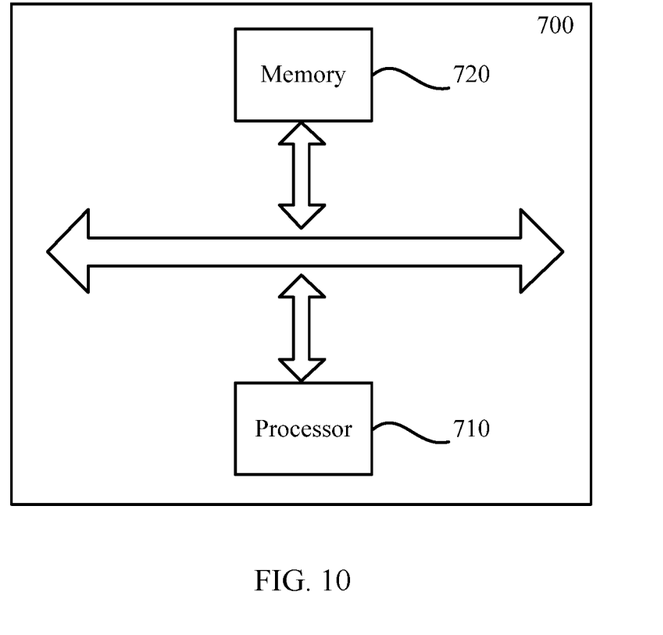
FIG. 10 is a schematic hardware structural diagram of a communication device according to an embodiment of the present application.

FIG. 10 is a schematic hardware structural diagram of a communication device 700 according to an embodiment of the present application. The communication device may be any suitable type of hardware device capable of performing the resource allocation method according to the embodiments of the present application, for example, the first base station, the second base station or the multi-network resource manager.

As illustrated in FIG. 10, the communication device 700 includes at least one processor 710 and a memory 720, and FIG. 10 uses one processor 710 as an example. The at least one processor 710 and the memory 720 may be connected via a bus or in another fashion, and FIG. 10 uses connection via the bus as an example.

The memory 720, as a non-volatile computer readable storage medium, may be configured to store non-volatile software programs, non-volatile computer executable programs and modules, for example, the program instructions/modules corresponding to the resource allocation method according to the embodiments of the present application (for example, the determining module 100 and the allocating module 200 as illustrated in FIG. 8, or the standard defining module 300 and the sub-frame aligning module 400 as illustrated in FIG. 9). The non-volatile software programs, instructions and modules stored in the memory 720, when being executed, cause the processor 710 to perform various function applications and data processing of a server, that is, performing the resource allocation method according to the above method embodiments.

The memory 720 may include a program memory area and data memory area, wherein the program memory area may store operation systems and application programs needed by at least function; and the data memory area may store data created according to the usage of the resource allocation system. In addition, the memory 720 may include a high speed random access memory, or include a non-volatile memory, for example, at least one disk storage device, a flash memory device, or another non-volatile solid storage device. In some embodiments, the memory 720 optionally includes memories remotely configured relative to the processor 710. These memories may be connected to the resource allocation system over a network. Examples of the above network include, but not limited to, the Internet, Intranet, local area network, mobile communication network and a combination thereof.

One or more modules are stored in the memory 720, and when being executed by the at least one processor 710, perform the resource allocation method according to any of the above method embodiments.

The product may perform the method according to the embodiments of the present application, has corresponding function modules for performing the method, and achieves the corresponding beneficial effects. For technical details that are not illustrated in detail in the embodiment, reference may be made to the description of the methods according to the embodiments of the present invention.

An embodiment of the present application further provides a non-volatile computer-readable storage medium, wherein the computer-readable storage medium stores computer executable instructions, which, when being executed by at least one processor, for example, the processor 710 as illustrated in FIG. 10, cause the at least one processor to perform the resource allocation method according to any of the above method embodiments, for example, performing steps 301, 302, 303*a* and 303*b* in the method as illustrated in FIG. 1 and implementing the functions of the determining module 100 and the allocating module 200 as illustrated in FIG. 8.

According to the above embodiments of the present application, a person skilled in the art may clearly understand that the embodiments of the present application may be implemented by means of hardware or by means of software plus a necessary general hardware platform. Persons of ordinary skill in the art may understand that all or part of the steps of the methods in the embodiments may be implemented by a program instructing relevant hardware. The program may be stored in a computer readable storage medium and may be executed by at least one processor. When the program runs, the steps of the methods in the embodiments are performed. The storage medium may be any medium capable of storing program codes, such as read-only memory (ROM), a random access memory (RAM), a magnetic disk, or a compact disc-read only memory (CD-ROM).

Described above are exemplary embodiments of the present application, but are not intended to limit the scope of the present application. Any equivalent structure or equivalent process variation made based on the specification and drawings of the present application, which is directly or indirectly applied in other related technical fields, fall within the scope of the present application.

What is claimed is:

1. A resource allocation method, comprising:
    determining, based on a configuration parameter of a first sub-frame, whether preferential transmission of the first sub-frame needs to be ensured, wherein the first sub-frame refers to a sub-frame in a first wireless communication system;
    defining a transmission direction of a second sub-frame which exerts cross-interference to the first sub-frame to be the same as that of the first sub-frame if preferential transmission of the first sub-frame needs to be ensured, wherein the second sub-frame refers to a sub-frame in a second wireless communication system; and
    defining OFDM symbols in the first sub-frame which exert cross-interference to the second sub-frame to be transmission prohibited if preferential transmission of the first sub-frame does not need to be ensured;
    wherein the determining, based on a configuration parameter of a first sub-frame, whether preferential transmission of the first sub-frame needs to be ensured comprises:
    determining, based on the configuration parameter, whether the first sub-frame is a control sub-frame; and
    determining that preferential transmission of the first sub-frame needs to be ensured if the first sub-frame is the control sub-frame;
    and,
    determining, based on the configuration parameter, whether the first sub-frame is a data sub-frame;
    calculating a priority value of the first sub-frame based on a service requirement of the data sub-frame if the first sub-frame is the data sub-frame; and
    determining that preferential transmission of the first sub-frame needs to be ensured if the priority value satisfies a predetermined standard.

2. The method according to claim 1, wherein the first wireless communication system is a TD-LTE system, and the second wireless system is a 5G system.

3. The method according to claim 1, wherein the control sub-frame comprises: a control sub-frame bearing a primary synchronization signal, and a control sub-frame bearing broadcast information and a secondary synchronization signal.

4. The method according to claim 3, wherein the defining a transmission direction of a second sub-frame which exerts cross-interference to the first sub-frame to be the same as that of the first sub-frame comprises:
    defining the transmission direction of the second sub-frame within corresponding time of first three OFDM symbols of the second sub-frame as downlink, wherein the first sub-frame is the control sub-frame bearing the primary synchronization signal.

5. The method according to claim 1, further comprising:
    adjusting the predetermined standard based on service offload policies of the first wireless communication system and the second wireless communication system; and
    modifying, based on an adjusted predetermined standard, the number of first sub-frames for which preferential transmission needs to be ensured.

6. The method according to claim 1, wherein the determining, based on whether the priority value satisfies the predetermined standard, whether preferential transmission of the first sub-frame needs to be ensured comprises:
    determining that preferential transmission of the first sub-frame needs to be ensured if the priority value of the first sub-frame is greater than a predetermined first threshold; and
    determining that preferential transmission of the first sub-frame does not need to be ensured if the priority value of the first sub-frame is less than a predetermined second threshold, wherein the first threshold is different from the second threshold.

7. The method according to claim 1, further comprising:
acquiring a start position of the first sub-frame; and
configuring a start position of the second sub-frame based on the start position of the first sub-frame to align the first sub-frame with the second sub-frame.

8. The method according to claim 1, further comprising:
transmitting symbol patterns of the OFDM symbols defined to be transmission prohibited in a common control region of the first sub-frame.

9. The method according to claim 1, wherein the defining OFDM symbols in the first sub-frame which exert cross-interference to the second sub-frame to be transmission prohibited if preferential transmission of the first sub-frame does not need to be ensured comprises:
using a transmission direction of the second sub-frame as a reference direction, determining a position of the first sub-frame different from the reference direction as a cross timeslot interference position within corresponding time; and
defining OFDM symbols corresponding to the cross timeslot interference position in the first sub-frame to be transmission prohibited.

10. A computer program product for use in a resource allocation system, comprising:
a non-volatile computer-readable storage medium, comprising:
a code configured to determine, based on a configuration parameter of a first sub-frame, whether preferential transmission of the first sub-frame needs to be ensured, wherein the first sub-frame refers to a sub-frame in a first wireless communication system;
a code configured to: define a transmission direction of a second sub-frame which exerts cross-interference to the first sub-frame to be the same as that of the first sub-frame if preferential transmission of the first sub-frame needs to be ensured, wherein the second sub-frame refers to a sub-frame in a second wireless communication system; and
a code configured to define OFDM symbols in the first sub-frame which exert cross-interference to the second sub-frame to be transmission prohibited if preferential transmission of the first sub-frame does not need to be ensured;
wherein the determine, based on a configuration parameter of a first sub-frame, whether preferential transmission of the first sub-frame needs to be ensured comprises:
determining, based on the configuration parameter, whether the first sub-frame is a control sub-frame; and
determining that preferential transmission of the first sub-frame needs to be ensured if the first sub-frame is the control sub-frame;
and,
determining, based on the configuration parameter, whether the first sub-frame is a data sub-frame;
calculating a priority value of the first sub-frame based on a service requirement of the data sub-frame if the first sub-frame is the data sub-frame; and
determining that preferential transmission of the first sub-frame needs to be ensured if the priority value satisfies a predetermined standard.

11. A communication device, comprising at least one processor and a memory communicably connected to the at least one processor; wherein
the memory stores instructions executable by the at least one processor, wherein, the instructions, when being executed by the at least one processor, cause the at least one processor to perform the steps of:
determining, based on a configuration parameter of a first sub-frame, whether preferential transmission of the first sub-frame needs to be ensured, wherein the first sub-frame refers to a sub-frame in a first wireless communication system;
defining a transmission direction of a second sub-frame which exerts cross-interference to the first sub-frame to be the same as that of the first sub-frame if preferential transmission of the first sub-frame needs to be ensured, wherein the second sub-frame refers to a sub-frame in a second wireless communication system; and
defining OFDM symbols in the first sub-frame which exert cross-interference to the second sub-frame to be transmission prohibited if preferential transmission of the first sub-frame does not need to be ensured;
wherein the determining, based on a configuration parameter of a first sub-frame, whether preferential transmission of the first sub-frame needs to be ensured comprises:
determining, based on the configuration parameter, whether the first sub-frame is a control sub-frame; and
determining that preferential transmission of the first sub-frame needs to be ensured if the first sub-frame is the control sub-frame;
and,
determining, based on the configuration parameter, whether the first sub-frame is a data sub-frame;
calculating a priority value of the first sub-frame based on a service requirement of the data sub-frame if the first sub-frame is the data sub-frame; and
determining that preferential transmission of the first sub-frame needs to be ensured if the priority value satisfies a predetermined standard.

12. The communication device according to claim 11, wherein the control sub-frame comprises: a control sub-frame bearing a primary synchronization signal, and a control sub-frame bearing broadcast information and a secondary synchronization signal.

13. The communication device according to claim 12, wherein the defining a transmission direction of a second sub-frame which exerts cross-interference to the first sub-frame to be the same as that of the first sub-frame comprises:
defining the transmission direction of the second sub-frame within corresponding time of first three OFDM symbols of the first sub-frame as downlink, wherein the first sub-frame is the control sub-frame bearing the primary synchronization signal.

14. The communication device according to claim 11, wherein the instructions, when being executed by the at least one processor, further cause the at least one processor to perform the steps of:
adjusting the predetermined standard based on service offload policies of the first wireless communication system and the second wireless communication system; and
modifying, based on an adjusted predetermined standard, the number of first sub-frames for which preferential transmission needs to be ensured.

15. The communication device according to claim 11, wherein the determining, based on whether the priority value satisfies the predetermined standard, whether preferential transmission of the first sub-frame needs to be ensured comprises:

determining that preferential transmission of the first sub-frame needs to be ensured if the priority value of the first sub-frame is greater than a predetermined first threshold; and determining that preferential transmission of the first sub-frame does not need to be ensured if the priority value of the first sub-frame is less than a predetermined second threshold, wherein the first threshold is different from the second threshold.

16. The communication device according to claim 11, wherein the instructions, when being executed by the at least one processor, further cause the at least one processor to perform the steps of:

acquiring a start position of the first sub-frame; and configuring a start position of the second sub-frame based on the start position of the first sub-frame to align the first sub-frame with the second sub-frame.

* * * * *